United States Patent [19]

Schneider et al.

[11] Patent Number: 4,557,561
[45] Date of Patent: Dec. 10, 1985

[54] DOPED GLASS AND PROCESS FOR MAKING

[75] Inventors: Hartmut Schneider; Egon Lebetzki, both of Munich, Fed. Rep. of Germany

[73] Assignee: Siemens Aktiengesellschaft, Berlin & Munich, Fed. Rep. of Germany

[21] Appl. No.: 476,571

[22] Filed: Mar. 18, 1983

Related U.S. Application Data

[63] Continuation-in-part of Ser. No. 285,617, Jul. 21, 1981, abandoned.

[30] Foreign Application Priority Data

Aug. 18, 1980 [DE] Fed. Rep. of Germany ....... 3031147

[51] Int. Cl.⁴ .......................................... C03B 37/025
[52] U.S. Cl. .................................. 350/96.34; 65/3.12; 65/3.2; 65/18.2
[58] Field of Search .................... 65/3.12, 3.2, 18.2; 501/37, 43, 44, 54, 57, 58, 59; 350/96.34

[56] References Cited

U.S. PATENT DOCUMENTS

| | | | |
|---|---|---|---|
| Re. 30,883 | 3/1982 | Rau et al. | 65/3.12 |
| 4,045,198 | 8/1977 | Rau et al. | 65/3.12 |
| 4,082,420 | 4/1978 | Shiraishi et al. | 65/3.12 |
| 4,165,915 | 8/1979 | Rau et al. | 65/3.12 |
| 4,221,825 | 9/1980 | Guerder et al. | 65/3.12 |
| 4,263,030 | 4/1981 | Kobayashi et al. | 65/3.12 |

FOREIGN PATENT DOCUMENTS

| | | | |
|---|---|---|---|
| 3031147 | of 0000 | Fed. Rep. of Germany . | |
| 3031160 | of 0000 | Fed. Rep. of Germany . | |
| 0030852 | 3/1979 | Japan | 65/3.12 |
| 0067533 | 5/1980 | Japan | 65/3.12 |

OTHER PUBLICATIONS

Schneider et al., article entitled "A New Method to Reduce the Central Dip and the OH⁻ Content in MCVD Preforms", Proc. Europ. Conference Optical Communication Cannes Sep. 1982, pp. 36–40.

Liegois article entitled "MCVD Single Mode Optical Fibers: The Core Concentration Profile" proceedings of 9th Int. Conf. on CVD, Sep. 1981, Gouvieux (France).

Liegois et al., article entitled "MCVD Preform Central Dip Reduction by Collapse under Fluorinated Atmosphere" appearing in Journal of Non-Crystalline Solids 47.2 (1982) 247-250, North Holland Publ. Co.

Manuse and Presby article entitled "Effects of Profile Deformations on Fiber Band Width", Applied Optics 18 (1975) pp. 3758-3783.

French, Tasker, and Simpson article entitled "Grated Index Fiber Waveguides with Borosilicate Composition: Fabrication Techniques", Applied Optics 15 (1976) pp. 1803-1807.

*Primary Examiner*—Arthur Kellogg
*Attorney, Agent, or Firm*—Hill, Van Santen, Steadman & Simpson

[57] ABSTRACT

Technique for making glass having a predetermined refractive index profile using fluorine doping and fluorine etching. A substrate glass body is coated with a plurality of successively applied vapor deposited glass layers wherein each succeeding layer is built with a larger quantity of fluorine than the adjacent preceding layer. The amount of the doping in each layer is such as to achieve the desired refractive index profile. Fluorine etching is employed to provide a uniform core before the glass body is heat fused into a rod-like structure suitable for the preparation of light waveguides for use in optical communications technology.

13 Claims, No Drawings

DOPED GLASS AND PROCESS FOR MAKING

RELATED APPLICATION

This application is a continuation-in-part of our earlier filed U.S. patent application Ser. No. 285,617 filed July 21, 1981, now abandoned the entire disclosure and contents of which is incorporated hereinto by reference.

BACKGROUND OF THE INVENTION

1. Field of the Invention

This invention lies in the field of glass preforms for drawing fiber optical waveguides for optical communications technology.

2. Prior Art

A major goal in light waveguides for use on optical communications technology is to achieve the lowest possible attenuation and pulse spread. Good homogeneity of the glass comprising a waveguide is a prerequisite for a low attenuation and a certain radial profile of refraction is a prerequisite for the low pulse spread. The profile of a paraboloid is suitable as the refractive index profile. Given this profile, it is possible to largely compensate for differences of transit time between individual mode groups in multimode glass fibers, and, thus, to keep pulse spread low. Thereby, the refractive index profile must be very precisely observed.

Glass fibers with a desire refractive index profile can be manufactured in such a manner that a glass rod is first manufactured which exhibits a corresponding refractive index profile. The fibers are drawn from such rod in such a manner that the shape of the refractive index profile in the rod is retained in the fibers drawn therefrom.

Glass rods with refractive index profiles can be manufactured in a method of the type initially cited. The so-called CVD method which is included among the methods of the type initially cited is particularly suited for step-shaped radial refractive index profiles such as exist, for example, given core-jacket glass fibers with a constant refractive index in the core and a constant refractive index in the jacket. In a current method of this type, the glass layers are deposited on the inside wall of a glass tube and the tube thus coated on the inside is deformed (melted) into a rod from which the desired fibers can be drawn.

In order to so deposit the glass layers, a reactive gas mixture is conducted through the tube which is heated from the outside. The chemical reaction is thermally triggered in the inside in the heating zone, whereby a powder exhibiting the composition of a desired glass is produced, is deposited on the inside wall of the tube, and is clear-melted into a glass film in the heating zone. The refractive index of the deposited glass can be influenced by the composition of the reactive gas mixture. Glass rods with a step-shaped refractive index profile, particularly for core-jacket glass fibers which are manufactured with the CVD method, are distinguished by a high homogeneity of the glass and the fibers drawn from them are distinguished by a low attenuation.

Refractive index profiles with a continuous curve, which, for example, correspond to a paraboloid profile, can be achieved with the CVD method by means of depositing a multitude of glass layers with refractive indexes which differ slightly from one another.

Thereby, in the production of a desired refractive index profile with a continuous curve, particularly having the profile of a paraboloid, it has turned out that settle marks, or ripples, occur of such a type that the individual layers no longer exhibit the desired homogenous composition in radial direction. It has further turned out that it is not practical to eliminate such inhomogeneities like settle marks or ripples by means of increasing the plurality of glass layers to be deposited while reducing the layer thicknesses.

Moreover, the preforms produced with such a known method exhibit a central disruption of the refractive index, particularly a central refractive index drop which has a disadvantageous influence on the band width of the fiber optical waveguides drawn from such a preform. This disruption has an increasingly disadvantageous effect on the band width with increases in breadth of the central disruption zone. A discussion of the "Effects of profile deformations on fiber bandwidths" was given by D. Marcuse and H. M. Presby in Appl. Opt. 18(1979) pp. 3758-3763.

BRIEF SUMMARY OF THE INVENTION

The invention related in one aspect to a method for manufacturing a glass composite having a predetermined index of refraction wherein at least two glass layers are successively precipitated on a glass substrate body from a gas phase upon initiation of a thermal reaction and wherein the composition of the respective individual glass layers is selected in such a manner that the sum of the indices of refraction of the individual layers corresponds to the desired predetermined index of refraction of the composite consisting of the substrate and the associated layers. Preferably said substrate body is cylindrically shaped and such layers are deposited on interior walls thereof. The invention further relates to the glass structures so produced which have a predetermined refractive index profile, especially doped silica glasses, as more particularly described herein.

In another aspect, the invention relates to a method for treating interior surface portions of such a composite of layers with an etching gas before collapsing the glass tube to form a rod suitable for use as a preform for drawing fiber optical waveguides for optical communications technology. The invention further relates to the rods so produced which have a prodetermined refractive index profile.

An object of the present invention to provide a system whereby a method which is generally of the type above cited can be improved to avoid fluctuations of the refractive index.

Another object is to provide glass layers for core-jacket type glass fibers which layers are doped with fluorine and which are produced by following an improved method which is generally of the type above cited.

Another object is to provide an improvement in such known method of the type above cited wherein the central refractive index disruption can be made narrower and, by so doing, the band width of the corresponding fiber optical waveguides can be improved.

The invention involves the discovery that fluorine has an attenuating influence on fluctuations of concentration which occur when practicing a method of the type above cited which appear to produce the undesired fluctuations in the refractive index. Thus, the smoothing of the refractive index profile is not predominantly achieved by means of the superimposition of two wavy concentration profiles which cancel one another out, but, rather, is achieved by means to true attenuation of concentration fluctuations.

Other and further aims, objects, purposes, advantages, uses, and the like for the present invention will be apparent to those skilled in the art from the present specification.

DETAILED DESCRIPTION

Advantageously, an individual glass layer as taught by this invention is doped with fluorine during its precipitation by the teachings of the present invention. In this procedure, the fluorine is advantageously introduced into the glass in such manner that the reactive gas mixture, from which a glass layer is deposited upon the initiation of a thermal reaction, contains a gaseous compound which incorporates fluorine in its molecular structure. Preferred gas compounds contain fluoride. Also, preferred are gaseous compounds which, in addition to fluorine, only contain elements which themselves, or whose oxides, have no significant tendency to dissolve in glass. Examples of particularly suitable such fluorine compounds include sulfurfluorine compounds, fluorohydrocarbons, nitrogen-fluorine compounds, mixtures thereof, and the like. In particular, all sulfur and nitrogen fluorides, fluorine containing halogenated hydrocarbons and/or carbonyl fluoride come into consideration here. Sulfur hexafluoride has proven particularly advantageous and is presently much preferred.

However, a gas composition (including a mixture of gases), in addition to a gaseous compound containing fluorine can also incorporate an element whose oxides easily dissolves in glass. By so doing, a second doping of a glass layer to be deposited can ensue simultaneously with a fluorine doping. Examples of particularly suitable compounds for such utilization in such a gas composition include: silicon tetrafluoride, boron trifluoride, phosphorus pentafluoride, mixtures thereof, and the like. These gaseous componds can lead to $SiO_2$, $B_2O_3$ and $P_2O_5$ dopings in a glass layer.

Preferably, glass layers each consisting of an alkali-free silica glass that is doped, or becomes doped, with one or more substances in addition to fluorine are deposited when practicing this invention. Thus, a silica glass which is only doped, or becomes only doped, with germanium and fluorine has proven particularly advantageous and is a presently and particularly preferred glass layer of this invention.

In addition to such a particularly preferred glass, a silica glass has also proven to be advantageous which is doped, or becomes doped, in addition to fluorine, with at least one of the oxides or fluoride of the further elements: Ge, Al, Ti, Ta, Sn, Nb, Zr, Yb, La, P, B, Sb, mixtures thereof, and the like.

With the technique of this invention, a new glass consisting of an oxide of a substance has also been created which is doped with fluorine and also with one or more further elements. Such a glass is excellently well suited for the manufacture of gradient fibers. This glass is further characterized by being alkali-free. A preferred such substance for such a glass is silica. In addition to being doped with fluorine, a particularly preferred such silica glass is further doped only with germania. Likewise suitable, however, is a silica glass which, in addition to being doped with fluorine, is at most also doped with at least one of the oxides of the further elements Ge, Al, Ti, Ta, Sn, Nb, Zr, Yb, La, P, B, Sb, mixtures thereof, and the like.

In this new glass, the fluorine functions as an oxygen substitute and exists as a fluorine bound to a substance or to one or more of the further elements. The fluoride reduces the refractive index of a glass, and, therefore, it can also be added to a glass intended for use in the jacket of a glass fiber.

An explanation of the relatively high fluctuations of concentration, and thus, of refractive index occurring without fluorine additive, seems to lie in the following observation (there is no wish to be bound herein by theory): In the precipitation from the gaseous phase with external heating which was undertaken, i.e, thermal reaction initiation, a partial de-mixing occurs in the arising glass layer because an oxide such as germania, which is more easily volatilized, precipitates further downstream in front of the burner placed at that location, and is then covered by glass which is lower in germanium dioxide. As already mentioned, it was observed that this effect cannot be eliminated practically by increasing the number of layers given a reduction of the layer thickness, this also being less attractive because of the limited heating capacity.

In addition to the significantly reduced pulse spread, which indicates a greater homogeneity of the glass contaminated with fluorine, it can be observed in an optical microscope that layers with fluorine additive are significantly more homogenous than layers without a fluorine additive. Analyses of the radial course of concentration with an electron microprobe have shown, as above mentioned, that the smoothing of the refractive index profile is not chiefly the result of the superimposition of two wavy concentration profiles, namely of the Ge and of the F profile, but rather that the fluorine has an attenuating effect on the germanium profile. With fluctuations below 5%, the latter already seems significantly more uniform resulting in the aforementioned, considerably increased, band width of such fibers. The better homogenation is to be attributed to the participation of volatile Si and Ge fluorides which have a lower difference in their transport properties than the oxides, and, accordingly, effect a more uniform precipitation from the gaseous phase.

As already mentioned, particularly coming into consideration as molecular gases containing fluorine are gases which, in addition to fluorine, only contain elements which themselves, or whose oxides, exhibit no significant tendency towards solution in the glass employed, here $SiO_2$. In addition to $SF_6$ and also other sulfur fluorides, such as $SO_2F_2$, $S_2F_2$, $SF_4$, $S_2F_{10}$ as well, are especially fluorohydrocarbons, and fluorohalohydrocarbons, such as, for example, $CCl_2F_2$, as well as nitrogen trifluoride ($NF_3$) and carbonylfluoride ($COF_2$).

As likewise already indicated, however, fluorides of elements can also be employed whose oxides dissolve easily in glass, silica glass especially. Particularly coming into consideration for this purpose are $SiF_4$, $BF_3$ and $PF_5$. These substances lead to $SiO_2$, $B_2O_3$ and $P_2O_5$ dopings.

By the term "doping", "doped", or equivalent, reference herein is had the addition of an impurity or impurities as to a gaseous composition as indicated herein or to a glass produced by this invention and thereby achieve a desired characteristic (as indicated herein) in such a glass. The quantity of such impurity or impurities (dopant or dopants) introduced into a given glass product (e.g., a glass layer in product glass composite) can very widely, depending upon a particular characteristic (e.g., index of refraction) desired, but generally falls in the range from about 0.1 to 30 weight percent (based on 100 weight percent total glass product weight), but larger and smaller amounts of any given dopant can be used if desired, as those skilled in the art will appreciate.

As used herein, the term "no significant tendency" in relation to doping elements employed in this invention has reference to the circumstance that such an element is not soluble in a product glass to an extent preferably not more than about 0.1 weight percent of a total product glass (in a layered form) based on a 100 weight percent total product glass weight.

Thus, for one presently preferred set of operating parameters, for each respective layer of glass deposited in a glass tube in accord with the present invention, the gas phase is passed through such tube at a flow rate of from about 200 to 2000 centimeters per minute. Concurrently, a longitudinally narrow oxyhydrogen gas burner is involved along the exterior of such tube in the direction of flow through such tube of such gas phase at a rate of from about 5 to 25 centimeters per minute, thereby to heat locally interior regions of such glass tube to a temperature ranging from about 1600 to 1900° C. over an axial (or longitudinal) moving zone of about 0.5 to 3·10$^{-3}$ grams per cubic centimeter. The total content of fluorine in such gas phase ranges from about 0.1 to 5 weight percent based upon 100 weight percent of the total such gase phase. Compositional progressive variations in glass forming components present in gas phases as needed to obtain a progressive radial change in profile of refractive induces from one layer to another are known generally to the prior art; see, for example, W. G. French; G. W. Tasker; J. R. Simpson: Graded index fiber waveguides with borosilicate composition: fabrication techniques. *Applied Optics* 15(1976) pp. 1803–1807.

To minimize the central refraction index disruption in a multilayered glass tube which can be, if desired, fabricated by prior art teachings as above cited, by the practice of this invention, one collapses such tube to form a rod in the presence of an etching gas in the inside of the tube. Preferably, the tube interior is flooded with such an etching gas during the collapsing. Preferably the tube containing at least two glass layers successively deposited on an outer tubular substrate.

Preferred etching gas compounds are those fluorine containing gaseous compounds hereinabove identified and which in addition to fluorine only contain elements which themselves, or whose oxides, have no significant tendency to dissolve in glass. A present particularly preferred such compound is sulfur hexafluoride.

The glass preforms manufactured in accord with the teachings of the present invention exhibit a central refractive index dip when the preform has been manufactured by means of collapsing a tube and when the core glass of such preform consists of at least two components, for examples, $SiO_2$ and $GeO_2$. The glass components can evaporate away from the inside of the tube at the high temperature employed during the collapsing phase. Due to their usually different respective volatilities, this leads to a change of respective concentrations in the surface composition which is detectable after the collapse of the tube as a change of refractive index. In the case of a mixture such as $SiO_2$-$GeO_2$, this is then a refractive index dip because of the higher $GeO_2$ volatility and the effect of $GeO_2$ in increasing the refractive index. Since the evaporating materials are usually redeposited at colder locations of the tube, refractive index peaks in the center of the preform can also be observed, these likewise having a disadvantageous effect on the band width of the fiber optical waveguides.

Fluorine compounds react with glass compositions. We are able to demonstrate that, given the standard conditions in the preform manufacturing process, a part of the glass volume is eroded form the inside wall of the tube, this typically corresponding to an 80% efficiency in the theoretical etching reaction:

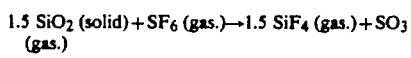

Thus, about 0.8 to 1.5 mol $SiO_2$ are eroded per mol $SF_6$ (see, in this regard, H. Schneider, U. Deserno, E. Lebetzki, A. Meier: "A new Method to Reduce the Central Dip and the OH Content in MCWD Preforms", *Proc. Europ. Conference Optical Communication*, Cannes, Sept. 1982, pp. 36–40, the disclosure and contents of which is entirely incorporated hereinto by reference. Similar reactions of the $SF_6$ also occur with the other glass components.

When, thus, gases containing fluorine are conducted through a tube during its collapse, then either the disrupted inner layer is eroded, or its formation is prevented by avoiding re-deposition. Product preforms thus exhibit a significantly narrower central range with a disrupted refractive index.

Preferably when so forming a rod from such a multilayered starting glass rod, the rod is prepared as described above using fluorine doping of individual glass layers.

In so processing a glass rod, the etching gas is preferably first passed through the starting rod at a gas flow rate of from about 200 to 2000 centimeters per minute while a narrow oxyhydrogen gas fumer is moved along the exterior of such glass tube in the direction of flow through such tube of such etching gas at a rate of from about 5 to 25 to heat locally interior regions of said glass tube to temperature ranging from about 1600 to 2000° C. over an axial (or longitudinal) moving zone of about 1 to 3 centimeters. The pressure of such gas phase ranges from about 0.5 to 3·10$^{-3}$ grams per cubic centimeter.

Thereafter, the so treated tube is flooded with etching gas while the burner is so moved again along the tube at such rate thereby to heat locally interior regions of such glass tube to a temperature about about 2000° C. and which temperature is at least sufficient to melt such glass tube into the desired rod. Excessive temperatures for melting are preferably avoided to minimize any unnecessary volatization of interior tube surface portions during rod formation.

Preferably the pressure of the etching gas ranges from about 0.5 to 3·10$^{-3}$ grams per cubic centimeter. Preferably, the etching gas is comprised of a mixture of 0.5 to 20% by volume of sulfur hexafluoride in oxygen. One preferred glass tube is comprised of $SiO_2$ and $GeO_2$ with fluorine doping.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

A silica glass tube approximately 1 m long and 20 mm in diameter with a wall thickness of 1.5 mm is heated in a glass lathe with the assistance of a narrow oxyhydrogen gas burner. First, the tube is cleaned. To that end, a gas stream consisting of 1100 NmL oxygen and 15 NmL/min sulfur hexafluoride is conducted through the tube (N thereby signifies the reference to normal conditions given one bar at 0° C.). The cleansing effect is brought about by the sulfur hexafluoride which has an etching influence on the glass at hot zone. The burner is moved in the direction of the gas stream along the tube with a speed of 15 cm/min and thereby drives the reaction products arising during the etching in front of it. The precipitation of glass layers which are intended for the jacket of the glass fiber is begun after three burner passes. To that end, 90 NmL/min silicon tetrachloride are added to the gas stream. The $SF_6$ feed can now be interrupted, but it can also be retained, although at a reduced value, for example 6 NmL/min. A precipitation of silica glass powder which is doped with fluorine then occurs in front of the burner and is clear-melted in the glass by means of the advancing burner.

After precipitation of ten such glass layers, the formation of jacket glass is terminated, and $GeCl_4$ gas, and if not already present, sulfur hexafluoride, preferably 6 NmL/min, are added to the gas stream, and the $GeCl_4$ gas stream is increased by approximately 44/60 NmL/min from burner pass to burner pass and, thus, from layer to layer.

It is expressly pointed out that the $GeCl_4$ gas stream is increased, but that the hexafluoride gas stream is kept constant.

After sixty layers have been precipitated in this manner, the formation of the core glass is terminated, the chloride feed is interrupted, and the flow of sulfur hexafluoride is reduced to approximately 1.5 NmL/min, and the flow of oxygen to 300 NmL/min, and the burner speed is reduced, so that the tube temperature rises to approximately 2000° C. At this temperature, the tube begins to collapse. Thereby due to the slight flow of sulfur hexafluoride, a slight etching and, thus, cleaning of the inside wall of the tube occurs.

Then, after approximately five burner passes, the gas flow-through is completely stopped, and the capillary tube which arises is melted into a solid rod in a new burner pass.

The rod or preform generated in such manner exhibits an outside diameter of 11 mm. The diameter of the core amounts to 5.2 mm. In the core, the germanium concentration increases radially from the outside toward the inside from 0 to 12 wt. %. The concentration curve closely follows a paraboloid as envelope. The fluoride concentration in all deposited layers is uniform at approximately 0.6% by weight of fluorine. With a half-width value of only 60 μm, the $GeO_2$ concentration sink in the center of the core is extremely narrow. This is essentially achieved due to the cleansing effect caused by the sulfur hexafluoride flow during the collapsing operation. The rinsing of the glass wall with sulfur hexafluoride after that also leads to a cleansing effect which has an extremely favorably influence on the glass being manufactured.

Given test conditions which were otherwise the same, but however, without a fluorine additive to the gaseous phase, a $GeO_2$ profile exhibits pronounced peaks and a broad concentration sink in the center of the core. Fluctuations between peaks and sinks of approximately 15% were observed. Pulse widths of approximately 2 ns were observed at two kilometer long fiber drawn from such a preform with pronounced peaks. In contrast therto, a pulse spread of only 0.5 ns, which corresponds to a band width of 2 $GH_z$/km, was observed in an equivalent fiber with a fluoride additive. Typical attenuation values of the fibers doped with fluorine are 0.8 dB/km at 1.55 mm. 5.5 dB/km (water maximum) were measured at 1.39 μm. The water maximum is higher without fluorine additive (50 kB/km).

Thus, in one aspect, the present invention is directed to an improved method for making a solid glass rod from which glass fibers having a refractive index profile having a uniform paraboloid configuration for use as light waveguides in optical communicators technology are formable. This method utilizes a series of sequential steps. Thus one heats an alkali-free silica glass tube which has been initially interiorly cleaned by a gas stream comprised of oxygen and sulfur hexafluoride using a narrow oxyhydrogen gas burner. Simultaneously, one first passes at a mean linear flow rate of from about 200 to 2000 centimeters per minute through said tube a first gaseous composition comprised of silicon tetrachloride, oxygen, and at least one fluorine containing gaseous compound. Such heating is conducted by moving the burner along the exterior of the tube in the direction of gas flow through the tube at a burner moving rate of from about 5 to 25 centimeters per minute. The interrelationship between such heating, such moving, such first passing, and such first gaseous composition is such that in front of the zone of heating produced by said burner a precipitation of silica glass powder doped with fluorine occurs which powder is clear-melted onto the interior wall portions of said tube in such zone of heating. This step involves at least two such first passings along the tube.

Next, a second passing at a mean linear flow rate of from about 200 to 2000 centimeters per minute through said tube is carried out using a second gaseous composition. As before, the fluorine is in the initial form of at least one fluorine containing gaseous compound. This second gaseous composition further includes silicon tetrachloride, at least one chloride of the further elements Ge, Al, Ti, Ta, Sn, Nb, Zr, Yb, La, P, B, Sb, and oxygen. Such second repeated passing is with such heating and such moving at least once. With each said moving, a new layer of glass is formed on said interior wall portions.

Next, a third passing at a mean linear flow rate of from about 200 to 200 centimeters per minute through said tube is undertaken using a final gaseous composition comprised of sulfur hexafluoride and oxygen. Concurrently, such moving is continued at a moving rate of from about 2 to 15 centimeters per minute. The interrelationship between such heating, such moving, such third passing, and such final gaseous composition being such that a cleaning of said interior wall portions results. Such third passing is repeated at least once.

Finally, one moves such burner along the resulting tube which maintains a temperature sufficient to melt such resulting tube into a solid rod.

Glass rods which are produced by the foregoing method are products of this invention.

EXAMPLE 2

In a second aspect, the present invention is directed to an improved method of making a solid glass rod with an arbitrary refractive index profile (step like or parabolic or otherwise) having only a small central refractive index disturbance. In this case, e.g., one may perform the same sequential steps as given in the example 1 but with or without addition of $SF_6$ during the first cleansing of the tube, the jacket glass deposition and/or the core glass deposition. After interruption of the chloride feed, the flow of 1.5 NmL/min. $SF_6$ and 300 NmL/min. $O_2$ are adjusted through the tube and the burner speed is reduced, so that the tube temperature rises to approximately 2000° C. At this temperature, the tube begins to shrink. After four or five burner passes, the gas flow-through is completely stopped and the capillary is closed.

It is also possible to use higher $SF_6$ flow tubes, e.g., 15 NmL/min. To avoid high mass losses by etching from the inside tube wall, it is preferable, but not necessary, to use the $SF_6$ flow only during one pass, preferably the fourth or fifth of the otherwise identical collapory procedure.

In both cases, one obtains a $GeO_2$ profile with an extremely narrow $GeO_2$ dip in the central region of approximately 50 μm diameter at half depth. After drawing the 125 μm diameter from the rod this dip is not resolveable as a profile defect. With the low $SF_6$ flow rate during collapsing, F doping of the inside tube wall occurs by diffusion which leads to a broad F peak in the center of typ. 0.8% by weight of fluorine in the glass, whereas with high $SF_6$ flow rate, the F doping is lower by a factor of five. In the first case, the corresponding refractive index profile shows a broad refractive index dip in fluorine diminishes the refractive index n of the glass ($\Delta n$ about 0.0015), which is also observed in the fiber. In the second case, the n profile is almost flat (deviations smaller than 0.0005). For details see H. Schneider et al., publ. cit. p. 11). Bh changing the fluoride flow and/or the type of fluoride in the tube during collapse, the refractive index in the central region can be modified in a certain range which is at the present time not fully explored.

EXAMPLE 3

It is also possible to use the fluoride doping of the gas phase only during glass precipitation. In this case, one may get an arbitrary $GeO_2$ concentration profile depending on the arbitrary chosen $GeCl_4$ gas phase concentration program (e.g., step-like or parabolic or otherwise defined), but smooth and without the ripples of the individual layers.

EXAMPLE 4

Before our invention of the use of $SF_6$, we developed the same procedure as described in example 1, but without the use of $SF_6$. These conditions, which we found by experience, might be similar to gas flow ranges sometimes quoted in the literature, but most likely they are not identical with specific and mostly not retrailed conditions used by others. The reason for this might be seen in the difference in experimental details as e.g., tube sizes and quality, type of burner used, temperature profile of the burner, type of temperature measurement or different target dimensions and concentrations.

Under these conditions without $SF_6$ throughout the process, one obtains a rod of nearly the same dimensions as in example 1 but with a $GeO_2$ concentration profile which exhibits pronounced ripples superimposed on the near parabolic profile and a broad (200 μm diameter at half depth) central profile dip.

In conclusion, let it be pointed out that the present invention can be advantageously employed everywhere where a desired refractive index or refractive index profile is to be produced by means of precipitating a multitude of glass layers.

We claim:

1. An improved method for making a solid phase rod from which glass fibers having a refractive index profile having a uniform paraboloid configuration for use as light waveguides in optical communicators technology are formable, said method comprising the sequential steps of:
   (A) heating an alkali-free silica glass tube which has been initially interiorly cleaned by a gas stream comprised of oxygen and sulfur hexafluoride with a narrow oxyhydrogen gas burner while simultaneously first passing at a flow rate of from about 200 to 2000 centimeters per minute through said tube a first gaseous composition comprised of silicon tetrachloride, oxygen, and at least one fluorine containing gaseous compound, said heating being conducted by moving said burner along the exterior of said tube in the direction of flow through said tube of said gaseous composition at a moving rate of from about 5 to 25 centimeters per minute, the interrelationship between said heating, said moving, said first passing, and said first gaseous composition being such that in front of the zone of heating produced by said burner a precipitation of silica glass powder doped with fluorine occurs which powder is clear-melted onto the interior wall portions of said tube in such zone of heating,
   (B) repeating step (A) at least twice,
   (C) secondly, passing at a flow rate of from about 200 to 2000 centimeters per minute through said tube a second gaseous composition containing higher relative weight percentages of fluorine than were present in said first gaseous composition, said fluorine being in the initial form of at least one fluorine containing gaseous compound, said second gaseous composition further including silicon tetrachloride, oxygen, and at least one further chloride of elements selected of the group consisting of Ge, Al, Ti, Ta, Sn, Nb, Zr, Yb, La, P, B, and Sb,
   (D) repeating said step (C) at least twice, each such repeat being conducted with a gaseous composition having a higher fluorine content,
   (E) thirdly, passing at a flow rate of from about 200 to 2000 centimeters per minute through said, tube a final gaseous composition comprised of sulfur hexafluoride while said moving is continued at a moving rate of from about 2 to 45 centimeters per minute, the interrelationship between said heating, said moving, said third passing, and said final gaseous composition being such that a cleaning of said interior wall portions results,
   (F) repeating said step (E) at least once,
   (G) moving said burner along resulting tube at a temperature sufficient to melt said resulting tube into a solid rod.

2. A glass rod produced by the method of claim 1.

3. A method for making a silica glass having a predetermined refractive index gradient profile said glass being comprised of a plurality of successive glass layers, said method comprising the steps of:
   successively depositing at glass forming temperatures each of said layers upon a substrate from a gas phase containing oxygen and at least one gaseous silicon compound from which silica glass is produced, introducing into said gas phase for each of said layers
   a gaseous dopant composition so as to produce in
   each said layer as so deposited a desired refractive
   index, said dopant composition being comprised of:
   a fluorine containing compound selected from the
      group consisting of sulfur fluorides, nitrogen
      fluorides, fluorohydrocarbons, fluorine contain-
      ing halogenated hydrocarbons, and carbonyl
      fluoride, and
   at least one other dopant compound containing an
      element selected from the group consisting of
      Ga, Al, Ti, Ta, Sn, Nb, Zr, Yb, La, P, B, Sb, and
      mixtures thereof, and
gradually increasing in said dopant composition as so
   introduced for each said layer the relative amount
   of said other dopant compound so that the refrac-
   tive index profile of such successive glass layers
   changes from layer to layer in accordance with a
   desired refractive index gradient profile while
   holding constant the amount of said fluorine con-
   taining compound.

4. The method of claim 3 wherein said gaseous compound comprises sulfur hexafluoride.

5. The method of claim 3 wherein each such resulting glass layer comprises a doped alkali-free silica glass.

6. The method of claim 5 wherein said substrate comprises silica glass cylindrically shaped and said glass layers are successively deposited on interior walls thereof.

7. The glass tube produced by the method of claim 6.

8. The method of claim 6 wherein, for each said respective successive layer, said gas phase is passed through said substrate at a gas flow rate of from about 200 to 2000 centimeters per minute while a narrow oxyhydrogen gas burner is moved along the exterior of said substrate in the direction of gas flow through said substrate at movement rate of from about 5 to 25 centimeters per minute, thereby to heat locally interior regions of said substrate to a temperature ranging from about 1600 to 1900° C.

9. The method of claim 8 wherein the pressure of said gas phase ranges from about 0.5 to $3 \cdot 10^3$ grams per cubic centimeter.

10. The method of claim 8 wherein the total content of fluorine in said gas phase ranges from about 0.1 to 5 weight percent based upon 100 weight percent of the total gas phase.

11. The glass tube produced by the method of claim 10.

12. The method of claim 3 wherein said element comprises germanium.

13. A method for making a silica glass having a predetermined refractive index gradient profile said glass being comprised of a plurality of successive glass layers, said method comprising the steps of:
   successively depositing at glass forming temperatures
      each of said layers upon from a gas phase contain-
      ing oxygen and at least one gaseous silicon com-
      pound from which silica glass is produced,
   introducing into said gas phase for each of said layers
      a gaseous dopant composition so as to produce in
      each said layer as so deposited a desired refractive
      index, said dopant composition being comprised of:
      a fluorine containing compound selected from the
         group consisting of sulfur fluorides, nitrogen
         fluorides, fluorohydrocarbons, fluorine contain-
         ing halogenated hydrocarbons, and carbonyl
         fluoride, and
      at least one other dopant compound containing an
         element selected from the group consisting of
         Ga, Al, Ti, Ta, Sn, Nb, Zr, Yb, La, P, B, Sb, and
         mixtures thereof, and
   gradually decreasing in said dopant composition as so
      introduced for each said layer the relative amount
      of said other dopant compound so that the refrac-
      tive index profile of such successive glass layers
      changes from layer to layer in accordance with a
      desired refractive index gradient profile while
      holding constant the amount of said fluorine con-
      taining compound.

* * * * *